Nov. 10, 1931.    R. C. HAM ET AL    1,831,560
ARTIFICIAL FLOWER
Filed June 11, 1930
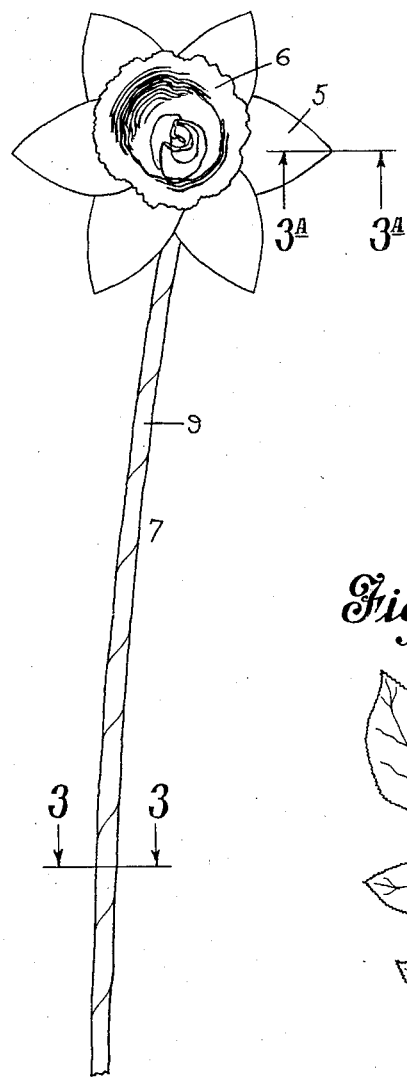
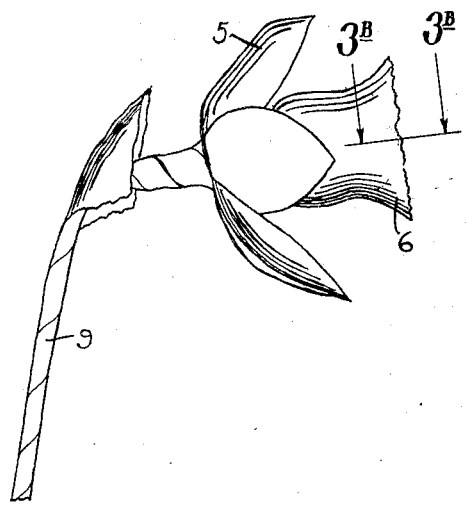
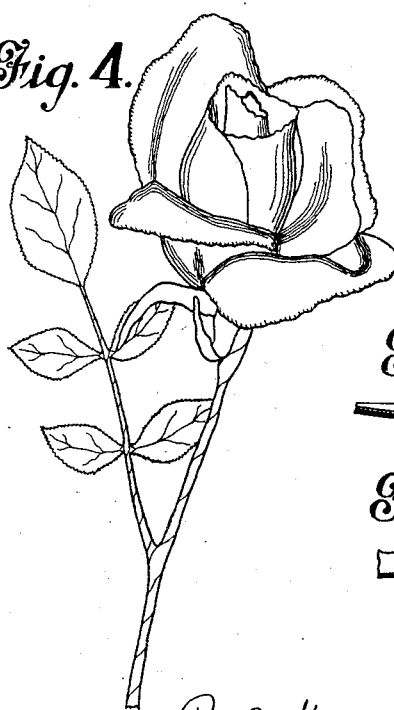

Patented Nov. 10, 1931

1,831,560

UNITED STATES PATENT OFFICE

ROBERT C. HAM AND MARION T. HAM, OF WEST HAVEN, CONNECTICUT, ASSIGNORS TO R. C. HAM & COMPANY, INCORPORATED, OF NEW HAVEN, CONNECTICUT

ARTIFICIAL FLOWER

Application filed June 11, 1930. Serial No. 460,400.

This invention relates to artificial flowers and more especially to artificial flowers in which the blossoms, and in some cases parts of the foliage as well, are constructed of crepe paper suitably colored, cut, folded, or otherwise manipulated for the production of the desired effect.

Crepe paper lends itself well to the manufacture of artificial flowers and has, of course, been extensively used for that purpose. Such flowers, however, readily become soiled and under the effects of dampness, etc., lose their shape and are otherwise lacking in durability, and, on account of their delicate or fragile character, serve as desirable ornaments only for a limited period.

It has been attempted to waterproof crepe paper, but in so far as we are aware, this has never been done satisfactorily and we know of no instances prior to our invention where artificial flower blossoms or blooms constructed of crepe paper have been effectively waterproofed and rendered readily washable by a simple and economical treatment which preserves the shape as well as the color of the blossom.

Crepe paper is of such a character as to readily absorb moisture and to carry much more moisture than ordinary paper having a flat or uncrinkled surface. When liquid is dropped or spilled upon crepe paper the latter immediately bulges or swells over the affected area and becomes soft and can be very easily perforated or torn. The main difficulty, however, consists in the fact that by the application of liquid the paper is permanently thrown out of shape and puckered or distorted. It, therefore, has been practically impossible to waterproof crepe paper flowers by the application of waterproofing solutions of the ordinary kind, especially by a treatment which involves dipping the blossom in the solution. In such cases it has been impossible to preserve the shape of the flower and also the color as imparted thereto before dipping, and difficulty has also been encountered in the treatment of artificial flower blossoms with waterproofing solutions because of the fact that such solutions generally impart to the blossom a high gloss which is very undesirable because unnatural. Further difficulty has been encountered also because of appreciable and harmful changes of color as a result of the treatment by solution, likewise as a result of the stiffening of the blossom by the material used for coating, as well as drawing of the paper out of shape by the drying of treating material which contracts upon drying and is hard and stiff when completely dry.

The primary object of our invention is to overcome the above-mentioned defects, drawbacks and disadvantages, and provide an artificial flower of crepe paper which is readily washable and wherein the waterproofing treatment is such as to preserve the desired form of the blossom, the desired color and, with the avoidance of great stiffness and rigidity, impart to the blossom a flat, natural looking surface closely resembling a natural blossom.

To these and other ends the invention consists in the novel features and steps to be hereinafter described and particularly pointed out in the claims.

In the accompanying drawings,

Fig. 1 is a front elevation of an artificial flower constructed in accordance with our improvements;

Fig. 2 is a side view of the same;

Fig. 3 is a section on line 3—3 of Fig. 1;

Fig. 3$^A$ is a section on line 3$^A$—3$^A$ of Fig. 1;

Fig. 3$^B$ is a section on line 3$^B$—3$^B$ of Fig. 2; and

Fig. 4 shows another kind of flower constructed in accordance with our invention.

In Figs. 1 and 2 we have shown an articial jonquil constructed in accordance with our invention. In the drawings the blossom and the stem of the flower are shown but the foliage is omitted. The blossom is constructed of crepe paper having, as purchased and used, the coloring which is desired to have appear in the finished flower. The crepe paper blossom is constructed of paper made up of different plies and in many cases the color of the plies is different. For example, where two-ply paper is used, one ply has exactly the correct tint for the inner surface of the blossom, while the other ply has the proper shade or tint for the outer surface of the blossom which is to be constructed. In the flower shown in Figs. 1 and 2, the petals 5 are constructed of three-ply crepe paper, as shown in Fig. 3ᴬ, whereas the cup part 6 of the blossom is constructed of two-ply crepe paper, as shown in Fig. 3ᴮ. The stem 7 is made up of a core 8 of wire or any other suitable material encased in a sheath 9 formed of a strip of crepe paper helically wound about the core.

For waterproofing the flower so as to render it readily washable, we dip the entire structure hereinbefore described in a waterproofing solution made of a clear and transparent nitrocellulose varnish containing, besides cellulose nitrate and a suitable solvent such as butyl alcohol, a clear, highly refined and colorless gum which upon drying provides a perfectly transparent coating. This solution is, it will be understood, entirely lacking in color, it being intended that it shall be perfectly transparent so as to show the initial color of the crepe paper without in any way obscuring or changing the tint or shade thereof. It is for this purpose that the pale gum is used in the nitrocellulose solution. This varnish, or lacquer as it is usually called, originally has about the consistency of castor oil but is thinned down by the use of a suitable lacquer thinner, usually in the proportion of one gallon of lacquer to one gallon of thinner, in order to provide a solution of proper consistency for application to the crepe paper which is to be treated for waterproofing. The flower structure previously described can then be dipped in the solution, removed and hung up to dry. The solution is very quick drying and usually dries in about thirty minutes, provided the surrounding air is fairly warm and dry. This solution forms a thin coating over the crepe paper and gives a dull mat finish having a very natural flower-like appearance. By this coating process the blossom is not to any extent drawn or distorted out of its original shape, nor is the blossom unduly stiffened by this treatment. The effect of the coating upon the paper is such as not to affect the structure of the paper and therefore the blossom is not in any way drawn or contracted. It has the same shape which it had before the dipping operation had been performed. The effect of the treatment with the solution upon the crepe paper is to make more permanent the cohesion between the different plies of the paper, and while the blossom after treatment is somewhat more stiff than previous to treatment, the coating, owing to the particular nature of the solution and to the use of the thinner employed in making the same, is such as to be extremely thin and not to stiffen the structure of the blossom to an undesirable extent. Furthermore, as before stated, the solution upon drying has a mat or dull finish which is distinctly desirable in the simulation of most natural flowers, and the flower has a natural "feel" as well.

In Fig. 4 we have shown an artificial rose made in accordance with our invention, and in this case we have shown the product as having leaves which in this case are constructed of a suitable fabric. These leaves are given the desired green color by the application of an oil paint, and in this case the treatment of such leaves (thus painted) with a lacquer solution would be quite undesirable as the latter would affect and prejudicially influence the color, causing a spotty, mottled and altogether unnatural appearance. Therefore, in this case the foliage of the flower is treated differently from the blossom, and instead of being dipped in a solution of nitrocellulose lacquer it is dipped in a solution of a shellac having a golden color and thinned with an alcohol solvent, there being two parts of alcohol to one of shellac compound. The blossom, however, which is made of crepe paper (usually two-ply crepe) is waterproofed by treatment with the nitrocellulose lacquer solution hereinbefore mentioned.

By our improvements the waterproofing of crepe paper flowers can be done readily and economically and the resulting flower is much superior to the ordinary crepe paper flower now found on the market. Crepe paper is unusually difficult to handle and goes to pieces when wet and loses its shape in an extraordinary manner, but by our improvements we are enabled to provide a process of treatment by dipping which gives very successful commercial results. The color of the paper as cut and folded is not in any way changed by the treatment; the color can be seen through the light thin coating without any loss of brilliancy or varying the shade of, say, the pink or yellow which is chosen in selecting a paper to give the most natural effect. White flowers can be very successfully coated as there is no dimming or clouding of the white in the paper by the application of the coating which, as heretofore stated, contains a gum or gums which are transparent so that the solution is usable with white paper for the production of white flowers such as lilies, narcissi, etc.

Further, by our improvements, the color of the flower can readily be enhanced by tinting if such is desired. For example, in the production of artificial hollyhocks the inner part of the flower can be given additional color to create the desired life-like effect. This additional color will usually be provided by the use of an alcohol dye. This dye is covered by the nitrocellulose film and not injuriously affected thereby. In some cases the color, if in the form of alcohol dye, can be applied after dipping in the nitrocellulose solution without its being necessary to redip the flower.

As the solution dries it is not only waterproof with a flat finish, but elastic and non-drawing in its effect upon the paper base structure.

For the treatment of foliage constructed of fabric and painted with oil paint, as hereinbefore described, the shellac compound used should be cut or diluted with formula No. 1 alcohol, i. e. alcohol devoid of benzol or benzine. The paint on foliage of this kind is usually linseed oil paint which is not attacked by the shellac compound. In the case of the crepe paper, however, it is understood that the color of the paper is derived from water soluble dyes which are not in any manner injuriously affected by the application of the lacquer solution hereinbefore described, which, on the other hand, preserves and brings out the original color in the paper, together with such colors as are applied to the crepe paper by alcohol dyes for tinting purposes either before or after the application of the lacquer solution.

It is obvious, of course, that in waterproofing the crepe paper blossoms, the latter may be sprayed if this is desired, but one of the most important features of our invention consists in providing a treatment whereby the crepe paper blossom can be dipped with the optimum results, and as dipping is much less time consuming than spraying, the former procedure is preferred.

In the case of the rose shown in Fig. 4, constructed of paper in different plies, the outer plies are of a yellow color and the inner plies of a pink color so as to give an effect which is present in certain of the modern roses, and this effect is enhanced and the structure improved by the employment of the process described, which, in addition, renders the blossom and the foliage readily washable.

Various changes can be made in the detailed procedure herein described without departing from the scope of our invention as described in the claims.

What we claim is:

1. An artificial flower constructed of crepe paper of the requisite color cut and folded to shape, said flower having a thin elastic mat-finished coating rendering the crepe paper waterproof, said coating being substantially transparent and colorless and consisting of a nitrocellulose varnish containing a pale gum, said coating extending over the edges of the crepe paper.

2. An artificial flower constructed of crepe paper of the requisite color cut and folded to shape, said flower having a thin elastic flat-finished coating rendering the crepe paper waterproof, said coating being substantially transparent and colorless and consisting of a suitable varnish through which the original shade of the paper is visible and which preserves and maintains the original shape and contour of the flower without distortion or puckering, said coating extending over and protecting the edges as well as the other surfaces of the petals.

3. An artificial flower constructed of crepe paper of the requisite color cut and folded to shape, said flower having a thin elastic flat-finished coating rendering the crepe paper waterproof, said coating being substantially transparent and colorless and consisting of a suitable varnish through which the original shade of the paper is visible and which preserves and maintains the original shape and contour of the flower without distortion or puckering, said flower being tinted in parts only by the application of an alcohol dye.

In witness whereof, we have hereunto set our hands this 10th day of June, 1930.

ROBERT C. HAM.
MARION T. HAM.